(12) United States Patent  (10) Patent No.: US 7,002,906 B1
Basso et al.  (45) Date of Patent: Feb. 21, 2006

(54) METHOD FOR EXTENDING THE CRANKBACK PROCEDURE TO ANY ASYNCHRONOUS TRANSFER MODE SYSTEM

(75) Inventors: Claude Basso, Nice (FR); Philippe Damon, Cagnes-sur-mer (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/334,414

(22) Filed: Jun. 16, 1999

(30) Foreign Application Priority Data

Aug. 28, 1998  (EP)  ................................ 98480058

(51) Int. Cl.
*H04J 1/16* (2006.01)
*H04L 12/28* (2006.01)

(52) U.S. Cl. ..................... 370/218; 370/228; 370/237; 370/395.21

(58) Field of Classification Search ................ 370/238, 370/228, 225, 216, 215, 236, 236.1, 237, 370/395, 400, 401, 235, 248, 410, 466, 217, 370/256, 395.21, 395.32, 420
See application file for complete search history.

(56) References Cited

U.S. PATENT DOCUMENTS

| | | | |
|---|---|---|---|
| 4,345,116 A | | 8/1982 | Ash et al. |
| 5,590,118 A | | 12/1996 | Nederlof .................... 370/218 |
| 5,649,108 A | | 7/1997 | Spiegel et al. |
| 5,831,975 A | * | 11/1998 | Chen et al. .................. 370/256 |
| 5,940,396 A | | 8/1999 | Rochberger .................. 370/408 |
| 6,078,586 A | * | 6/2000 | Dugan et al. ............. 370/395.2 |
| 6,111,881 A | * | 8/2000 | Soncodi .................. 370/395.32 |
| 6,147,971 A | * | 11/2000 | Rochberger et al. ........ 370/238 |

(Continued)

*Primary Examiner*—Seema S. Rao
*Assistant Examiner*—Melanie Jagannathan
(74) *Attorney, Agent, or Firm*—Cesari and McKenna, LLP (57) ABSTRACT

Method for extending the crankback procedure in an Asynchronous Transfer Mode (ATM) system composed of at least a first data network (10) comprising a plurality of switching nodes interconnected by connection lines and including end switching nodes each being connected to at least a Data Transmission equipment (DTE) and being used either as an entry border node (22) when it is connected to a source DTE (18) or an exit border node (28) when it is connected to a destination DTE (20), the network using a routing protocol of the type wherein a best route between a source DTE and a destination DTE is determined in a control point associated with the entry border node to which is connected the source DTE and wherein a set-up message is sent by the entry border node, and a second data network (12) including at least one DTE to be used as destination DTE in an exchange of data with a source DTE connected to the first data network and being interconnected with the first data network by means of at least two links (14, 16) not supporting the routing protocol. Such a method consists, when the exit border node of the first data network receives a clearing message on one link indicating that the set-up message has been rejected because the best route is blocked anywhere in the second data network, in building a crankback information element to be added to the clearing message for enabling the entry border node to find an alternate route avoiding the portion of the route which is blocked.

34 Claims, 3 Drawing Sheets

U.S. PATENT DOCUMENTS

| | | | |
|---|---|---|---|
| 6,208,623 B1 * | 3/2001 | Rochberger et al. | 370/254 |
| 6,215,765 B1 * | 4/2001 | McAllister et al. | 370/217 |
| 6,229,787 B1 * | 5/2001 | Byrne | 370/218 |
| 6,272,107 B1 * | 8/2001 | Rochberger et al. | 370/216 |
| 6,292,463 B1 * | 9/2001 | Burns et al. | 370/216 |
| 6,483,807 B1 * | 11/2002 | Manning et al. | 370/236 |
| 6,563,798 B1 * | 5/2003 | Cheng | 370/255 |
| 6,600,724 B1 * | 7/2003 | Cheng | 370/256 |

* cited by examiner

METHOD FOR EXTENDING THE CRANKBACK PROCEDURE TO ANY ASYNCHRONOUS TRANSFER MODE SYSTEM

TECHNICAL FIELD

The present invention relates to the establishment of Asynchronous Transfer Mode (ATM) connections by using ATM forum signaling standards and particularly to a method for extending the crankback procedure to any ATM system.

BACKGROUND

Different techniques have been developed for transporting information over a network, such as packet switching techniques whereby digitized data is arranged into so-called bit packets, and circuit switching techniques. In packet switching, bit packets may either be of fixed length like in the Asynchronous Transfer Mode (ATM) where the packets, also called cells, are all of a conventional fixed length, or be of variable length.

ATM has been recognized as the common base on which different types of services and networks can operate. The ATM technology can efficiently combine the transmission of speech, video, audio sound (what is commonly called multimedia traffic) and computer data into the wired network. Furthermore, ATM has proven to scale well from very high speed network infrastructure (the information highways) to customer premises networks. One of the great advantages of the ATM technology is the fact that it can guarantee some level of service when an ATM connection is set up. Such guarantees can correspond to transmission rate, transmission latency and information loss. They can be achieved mainly because the ATM architecture assumes that the transmission media are almost error free.

Before data are exchanged between a source Data Terminal Equipment (DTE) and a destination DTE, in an ATM network, a routing procedure takes place during which the Control Point of the entry border node determines the best route from the source DTE to the destination DTE. Afterwards, the origin Control Point (in the entry border node) sends a connection set-up message, a copy of is being delivered to the control point of every switching node on the route.

When the route has been established, a confirmation message is sent back to the entry border node which can then initiate the exchange of information between the source DTE and the destination DTE.

An ATM network generally uses the Private Network Network Interface (PNNI) protocol. In such a protocol, a Designated Transit List (DTL) containing the list of nodes and port identifiers defining the path from the source DTE to the destination DTE is added to the set-up message and is used as a route vector along the path.

When interconnecting an ATM network running the PNNI protocol with another network through an Interim Inter-Switch Protocol (IISP) interface, no dynamic routing information is exchanged between the networks and it is impossible to use procedure such as Crankback (used in PNNI protocol) to ensure that a connection will be set-up even if a part of the other network is down.

When a set-up message is rejected through an IISP interface, there is no crankback information element in the clearing message (it is only defined on a PNNI interface). Therefore, only a regular call clearing message is received by the entry border node from the IISP interface. Such a clearing message only contains a cause information element. Furthermore, no retry is performed.

Several approaches have been used to remedy this type of problem. One solution consists in just doing nothing at all except waiting for the failing part of the network to recover. Of course, this solution is unacceptable because it may take a very long time. During that time many users cannot use the network.

Another approach is to get rid of IISP interface everywhere and to use PNNI protocol with the hierarchy everywhere. This is technically valid but it is almost impossible in the real-life environment for many reasons. First, not all products implement the PNNI protocol, while all of them implement the IISP. Second, a product may be able to implement the cases, but the PNNI protocol is a feature the customer has to pay for. The customer may not want to pay for it, may not want to change his network at all, and therefore may want to keep the IISP interfaces.

Still another approach consists in defining a new type of interface which would be an IISP-like with some extended feature which would solve the problem. This is not very good because it would be like some new proprietary protocol. In that case, this interface would not be compatible with current ATM Forum standards, and especially not compatible with the IISP interface. The consequence is that interoperability is completely jeopardized.

Accordingly, there is a need for a mechanism which extends the current standards procedures defined by the ATM Forum so that it becomes possible to solve the above problem cases without violating any standard procedure.

SUMMARY OF THE INVENTION

The main object of the invention is therefore to provide a method for extending the crankback procedure to any asynchronous transfer mode system without violating the existing standard procedure.

Another object of the invention is to provide a data transmission system including at least two links not supporting the PNNI protocol with an extension of the crankback procedure.

The invention relates to a method for extending the crankback procedure in an Asynchronous Transfer Mode (ATM) system composed of at least a first data network comprising a plurality of switching nodes interconnected by connection lines and including end switching nodes each being connected to at least a Data Transmission equipment (DTE) and being used either as an entry border node when it is connected to a source DTE or an exit border node when it is connected to a destination DTE, the network using a routing protocol of the type wherein a best route between a source DTE and a destination DTE is determined in a control point associated with the entry border node to which is connected the source DTE and wherein a set-up message is sent by the entry border node, and a second data network including at least one DTE to be used as destination DTE in an exchange of data with a source DTE connected to the first data network and being interconnected with the first data network by means of at least two links not supporting the routing protocol. This method consists, when the exit border node of the first data network receives a clearing message on one link indicating that the set-up message has been rejected because the best route is blocked anywhere in the second data network, in building a crankback information element to be added to the clearing message for enabling the entry border node to find an alternate route avoiding the portion of the preceding best route which is blocked.

BRIEF DESCRIPTION OF THE DRAWINGS

The objects, characteristics and advantages of the invention will become clear from the following description given in reference to the accompanying drawings wherein.

DETAILED DESCRIPTION OF THE INVENTION

Figure 1:
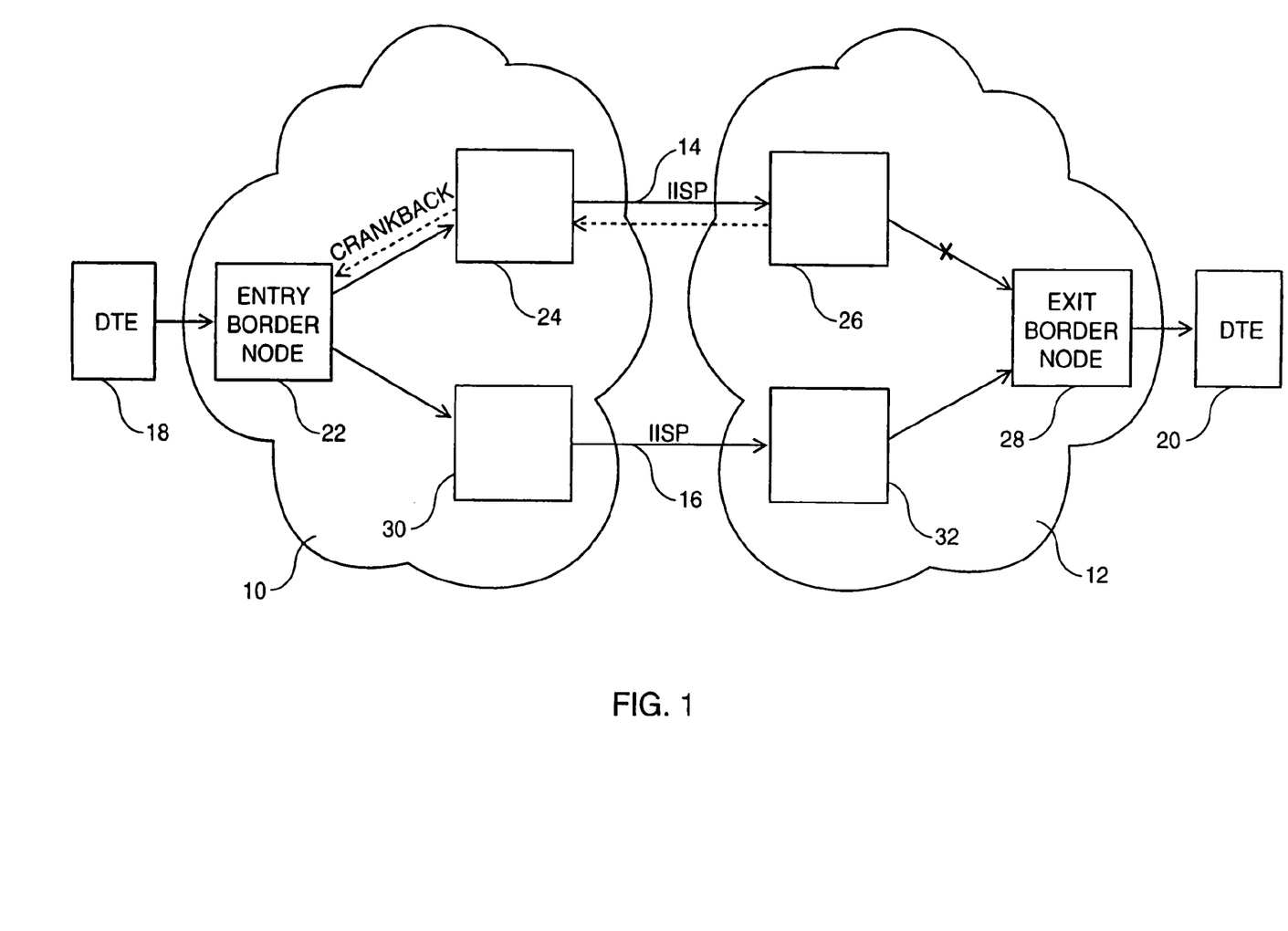
FIG. 1 is a block-diagram representing a connection between a source DTE and a destination DTE through a first ATM network and a second ATM network connected there between by two IISP links.

In reference to FIG. 1, it is assumed that a first ATM network 10 is interconnected with another ATM network 12 by means of two IISP links 14 and 16. Assuming that DTE 18 wants to exchange information with DTE 20, entry border node 22 to which is connected DTE 18 selects the best route by using the routing protocol supported by PNNI, this best route in network 10 being {node 22, node 24}. Then, node 24 has no other choice than IISP link 14 to reach the second ATM network 12 and the best path in this network to reach DTE 20, that is {node 26, node 28}.

Assuming that the link between node 26 and exit border node 28 is blocked as illustrated in FIG. 1 by a cross, a clearing message is sent back by node 26 to node 24 (dashed line). If this clearing message contains a cause for which crankback may be generated, a crankback information element is created by node 24 and added to the clearing message to be forwarded to entry border node 22. Entry border node 22 tries to find an alternate route to reach exit border node 28. In the present case, an alternate route is {node 22, node 30} in network 10, link IISP 16 and {node 32, node 28} in network 12. Then, a call set-up message is forwarded by node 22 along this alternate route.

Note that, in the case illustrated by FIG. 1, the route is blocked between the two nodes 26 and 28. The route could have been blocked because IISP link 14 is no longer valid. In such a case, a clearing message is generated by node 24 and contains originally the crankback information element.

Figure 2:
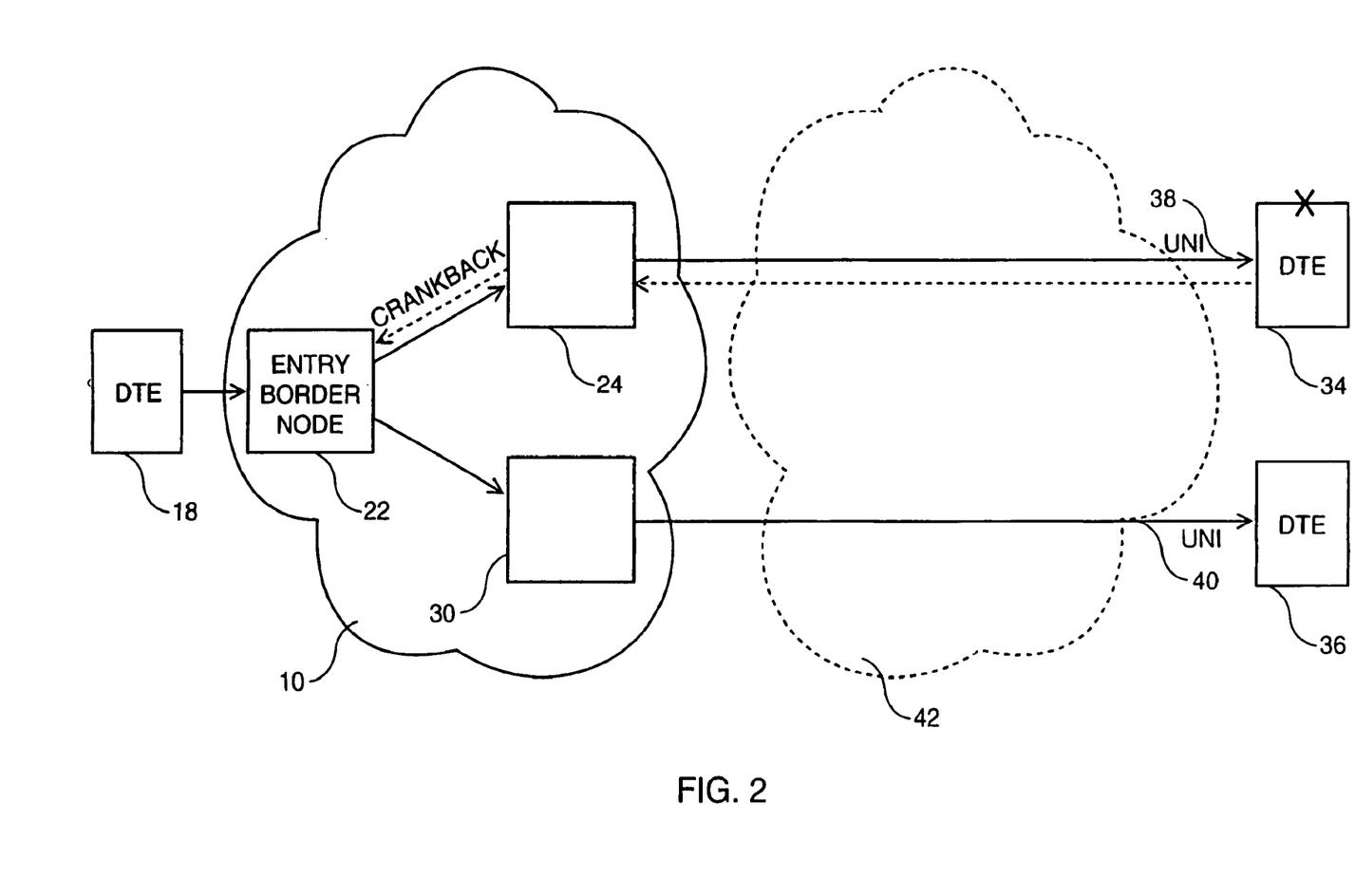
FIG. 2 is a block-diagram representing a connection between a source DTE and two destination DTEs having the same address through an ATM network to which are connected the two destination DTEs by means of UNI links.

FIG. 2 illustrates the case where the first ATM network is linked to two DTE devices 34, 36 by two UNI links 38 and 40. Note that it does not matter that the two UNI (User-Network-Interface) links are connected directly to first network 10 or indirectly by means of a second network 42 represented by a dashed line in the figure.

Assuming that DTE 18 wants to exchange information with DTE 34, the best route determined by entry border node 22 is {node 22, node 24} in network 10 and then UNI link 38 to DTE 34. If, for any reason, DTE 34 is out of order, node 24 generates a crankback information element as in the preceding example and adds it in the clearing message sent back to entry border node 22. This one finds an alternate path which is {node 22, node 30} in network 10, and UNI link 40 to reach DTE 36 that has the same address as DTE 34 which has failed.

Figure 3:
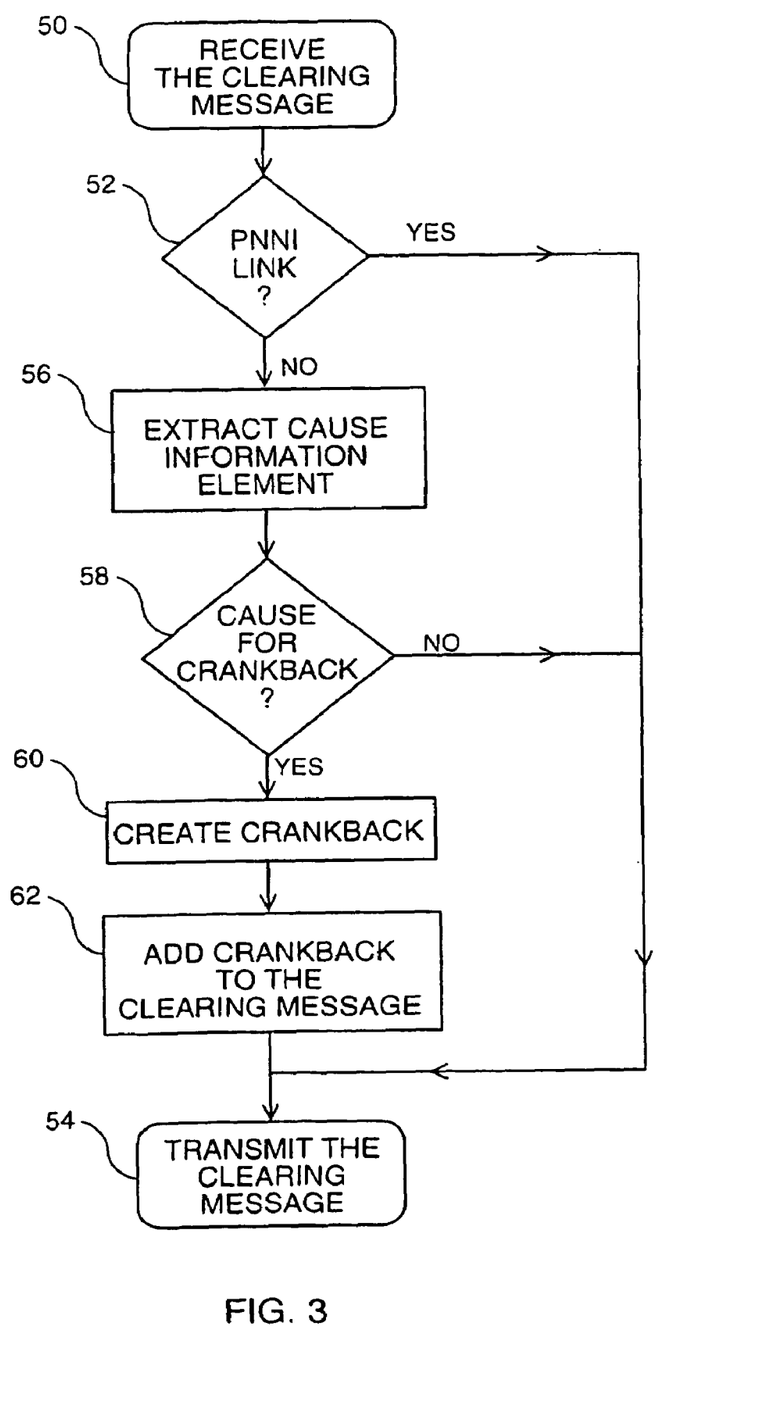
FIG. 3 is a flow chart of the crankback extension procedure according to the invention.

The flow-chart of the method steps carried out by the node which generates the crankback information is represented in FIG. 3. After receiving the clearing message (50), the node such as node 24 in FIGS. 1 and 2, checks whether the link just after it on the route is a PNNI link (52). If so, the clearing message is forwarded downward to the entry border node (54). If not the cause information element is extracted from the clearing message (56). Definition of causes is provided in UNI 3.0—Annexe E of the ATM Forum, wherein several groups of causes are defined, such as the Normal group. Then, it is determined whether the cause is really a cause requiring a rerouting (58). Indeed, some causes do not require to generate a crankback information, such as for example, cause 31 of the Normal group which corresponds to "normal call clearing" from the end system. In such a case, the clearing message is transmitted to the entry border route (54). The definition of the cause filter which is applied in step 58, depends upon the implementation of the invention. Indeed, the cause element as defined in the ATM Forum comprises three different fields: "location", "value", and "diagnostic", and the cause filter may apply to any of these fields. In a preferred embodiment of the invention, the cause filter applies only to the "value" field. Furthermore, the cause filter may be programmed statically by the network administrator or user, or dynamically by the network itself according to statististic data.

If the cause justifies a crankback generation (for example when the resources are unavailable), the node creates a crankback information element (60) which contains information as mentioned hereafter. This crankback information element is then added to the clearing message (62) which is transmitted to the entry border node.

The crankback information element contains, in the procedure implemented by the PNNI protocol:
the blocked transit type which can be "succeeding", "node" or "preceding"
the block transit identifier which depends on the blocked transit type and is empty if the types is "succeeding"

identifies the blocked node if the type is "node" identifies the node that is preceding the blocked link if the type is "preceding"

the crankback cause which is generally the information received in the clearing message.

Therefore, in a system in which the method according to the invention is implemented, a way to specify that a link not supported by the PNNI protocol (such as IISP or UNI link) is blocked is to or create an information element with the blocked transit type being "preceding" and wherein only the identifier of the preceding node is not zero

The invention claimed is:

1. In an Asynchronous Transfer Mode (ATM) system composed of at least a first data network (10) having a plurality of switching nodes interconnected by connection lines and including end switching nodes each being connected to at least a Data Transmission equipment (DTE) and being used either as an entry border node (22) when it is connected to a source DTE (18) or an exit border node (28) when it is connected to a destination DTE (20), said first data network using a routing protocol of the type wherein a best route between a source DTE and a destination DTE is determined in a control point associated with said entry border node to which is connected said source DTE and wherein a set-up message is sent by said entry border node, and a second data network (12) including at least one DTE to be used as destination DTE in an exchange of data with a source DTE connected to said first data network and being interconnected with said first data network by means of at least two Interim Inter Switch Protocol (IISP) links (14, 16)

not supporting said routing protocol, the at least two IISP links not supporting said routing protocol connecting switching nodes of the first data network with switching nodes of the second data network;

method for extending the crankback procedure over all said system comprising:

when the a switching node of said first data network receives a clearing message on one of said IISP links indicating that said set-up message has been rejected because said best route is blocked anywhere in said second data network, said switching node building a crankback information element to be added to said clearing message, said crankback information element and said clearing message then transmitted to said entry border node causing said entry border.

2. The method according to claim 1, wherein said crankback information element includes a blocked transit type which can be "preceding", "node" or "succeeding", a blocked transit identifier depending on said blocked transit type and a crankback cause.

3. The method according to claim 2, wherein said blocked transit type is "preceding" and said blocked transit identifier identifies the node preceding the IISP link not supporting said routing protocol as being blocked.

4. Asynchronous Transfer Mode (ATM) system composed of at least a first data network (10) having, a plurality of switching nodes interconnected by connection lines and including end switching nodes each being connected to at least a Data Transmission equipment (DTE) and being used either as an entry border node (22) when it is connected to a source DTE (18) or an exit border node (28) when it is connected to a destination DTE (20), said network using a routing protocol of the type wherein a best route between a source DTE and a destination DTE is determined in a control point associated with said entry border node to which is connected said source DTE and wherein a set-up message is sent by said entry border node, and a second data network (12) including at least one DTE to be used as destination DTE in an exchange of data with a source DTE connected to said first data network and being interconnected with said first data network by means of at least two Interim Inter Switch Protocol (IISP) links (14, 16) not supporting said routing protocol, the at least two IISP links not supporting said routing protocol connecting switching node of the first data network with switching nodes of the second data network; said system further comprising:

means for extending the crankback procedure over all said system, when a switching node of said first data network receives a clearing message on one of said IISP links indicating that said set-up message has been rejected because said best route is blocked anywhere in said second data network, a crankback information element to be added to said clearing message, the clearing message transmitted from the switching node to said entry border node of the first network causing said entry border node to find an alternate route avoiding the portion of said best route which is blocked.

5. The system according to claim 4, wherein said crankback information element includes a blocked transit type which can be "preceding", "node4" or "succeeding", a blocked transit identifier depending on said blocked transit type and a crankback cause.

6. The system according to claim 5, wherein said blocked transit type is "preceding" and said blocked transit identifier identifies the node preceding the IISP link not supporting said routing protocol as being blocked.

7. For use in a system having a first network and a second network, said first network having at least one entry border node connected to a source node, said first network adhering to a routing protocol which includes the use of a crankback procedure to inform the entry border node of a path failure within the first network, said second network having at least one exit border node connected to a destination node, said second network including at least some elements which do not use a crankback procedure, said first and second networks being interconnected through a plurality of User-Network-Interface (UNI) links connecting a plurality of switching nodes within each network, the plurality of UNI links connecting at least one switching node of the first data network with at least one switching node of the second data network, a method of extending the crankback procedure to cover path failures in said second network, said method being implemented in a switching node in said first network on a proposed path between the source node and the destination node and comprising the steps of:

monitoring messages returned from the second network relating to the proposed path for a clearing message indicative of a failure in the proposed path anywhere in the second network;

in response to detection of said clearing message, generating a crankback information element;

modifying said clearing message by adding said generated crankback information element;

transmitting the modified clearing message from the switching node of the first data network to the entry border node.

8. The method according to claim 7 wherein said crankback information element includes a blocked transit type field, a blocked transit identifier field and a crankback cause field.

9. A method for use in a switching node in a first network of a system having a first and second network using a best-route routing protocol interconnected by at least two User-Network-Interface (UNI) links, the at least two UNI links connecting switching nodes of the first network to switching nodes of the second computer network, said first network having an entry border node to determine a best route, said method comprising:

receiving, at said switching node of the first network, a clearing message from said second network indicating a rejection of said best route;

generating, at said switching node of the first network, a crankback information element in response to said clearing message;

adding, at said switching node of the first network, said crankback information element to said clearing message; and forwarding said clearing message and crankback information element from said switching node to said entry border node.

10. The method of claim 9, further comprising: wherein said system is an Asynchronous Transfer Mode (ATM) system.

11. The method of claim 9, further comprising: wherein said a best-route routing protocol is a Private Network Interface (PNNI) protocol.

12. The method of claim 9, further comprising: wherein said crankback information element includes a blocked transit type field, a blocked transit identifier field, and a crankback cause field.

13. A switching node in a first network of a system having a first and second network using a best-route routing protocol interconnected by at least two Interim Inter Switch Protocol (IISP) links, the at least two IISP links connecting switching nodes of the first network to switching nodes of the second computer network, said first network having an entry border node to determine a best route, said switching node comprising:

means for receiving a clearing message from said second network indicating a rejection of said best route;

means for generating a crankback information element in response to said clearing message;

means for adding said crankback information element to said clearing message; and means for forwarding said clearing message and crankback information element to said entry border node.

14. A system, comprising:

a first network using a best-route routing protocol;

at least two Interim Inter Switch Protocol (IISP) links connected to said first network;

a second network using a best-route routing protocol, said second network interconnected with said first network by said at least two IISP links;

an entry border node in said first network to send a set-up message having a best route from said first network to said second network; and a first switching node in said first network connected to one of said at least two IISP links, a second switching node in said second network connected to said first switching node by said one of said at least two IISP links, said first switching node to receive a clearing message from said second network indicating a rejection of said best route, said first switching node to generate a crankback information element in response to said clearing message, and add said crankback information element to said clearing message, and forward said clearing message and crankback information element to said entry border node.

15. The system of claim 14, further comprising: wherein said system is an Asynchronous Transfer Mode (ATM) system.

16. The system of claim 14, further comprising:

wherein said a best-route routing protocol is a Private Network Network Interface (PNNI) protocol.

17. The system of claim 14, further comprising: wherein said crankback information element includes a blocked transit type field, a blocked transit identifier field, and a crankback cause field.

18. In a system having a first and second network using a best-route routing protocol interconnected by at least two Interim Inter Switch Protocol (IISP) links, a method comprising:

sending a set-up message from a first node of said first network to a second node of said second network over one of said at least two IISP links, said set-up message having a best route;

receiving a clearing message at said first border node of said first network from said second network indicating a rejection of said best route;

generating, at said first node, a crankback information element in response to said clearing message;

adding said crankback information element to said clearing message;

forwarding said clearing message and crankback information element from said first node to said entry border node in said first network; and determining, at said entry border node in said first network, an alternate route over another of said at least two IISP links, thereby avoiding said rejected portion of said best route.

19. A computer readable media, comprising: said computer readable media containing instructions for execution in a processor for:

receiving by the node a clearing message indicating a link in a second network is blocked;

determining by the node that the clearing message arrived over a link to the second computer network that does not support the best-route protocol and that the clearing message contains a cause for which crankback may be generated;

in response to the determining generating a new clearing message at the node including a crankback information element;

forwarding the new clearing message including the crankback information element to an entry border node, whereby the entry border node selects an alternate route over a second network link that does not support the best-route protocol to access the second network; and wherein the link to the second computer network that does not support the best-route protocol is a User-Network-Interface (UNI) link.

20. A method for operating computer networks comprising:

providing a first computer network implementing a PNNI network protocol;

providing a second computer network implementing the PNNI network protocol;

interconnecting the first and the second computer networks by at least two network links not supporting the PNNI protocol;

receiving by a switching node of the first computer network a clearing message from the second computer network indicating a link in the second network is blocked;

determining by the switching node, that the clearing message arrived over a first of the at least two network links not supporting the PNNI protocol and that the clearing message contains a cause for which crankback may be generated;

in response to the determining, generating a new clearing message at the switching node including a crankback information element;

forwarding the clearing message including the crankback information element to an entry border node in the first computer network;

selecting, at the entry border node in the first network, an alternate route over a second of the at least two network links not supporting the PNNI protocol to avoid the link in the second computer network that is blocked; and wherein the at least two network links not supporting the PNNI protocol are Interim Inter Switch Protocol (IISP) links.

21. A method for operating computer networks comprising:

providing a first computer network implementing a PNNI network protocol;

providing a second computer network implementing the PNNI network protocol;

interconnecting the first and the second computer networks by at least two network links not supporting the PNNI protocol;

receiving by a switching node of the first computer network a clearing message from the second computer network indicating a link in the second network is blocked;

determining by the switching node, that the clearing message arrived over a first of the at least two network links not supporting the PNNI protocol and that the clearing message contains a cause for which crankback may be generated;
in response to the determining, generating a new clearing message at the switching node including a crankback information element;
forwarding the clearing message including the crankback information element to an entry border node in the first computer network;
selecting, at the entry border node in the first network, an alternate route over a second of the at least two network links not supporting the PNNI protocol to avoid the link in the second computer network that is blocked; and
wherein the at least two network links not supporting the PNNI protocol are User-Network-Interface (UNI) links.

22. The method of claim 20 further comprising:
wherein the crankback information element includes a blocked transit type field, a blocked transit identifier field, and a crankback cause field.

23. A method for operating a node in a first computer network, the first computer network supporting a best-route routing protocol, the method comprising:
receiving by the node a clearing message indicating a link in a second network is blocked;
determining by the node that the clearing message arrived over a link to the second computer network that does not support the best-route protocol and that the clearing message contains a cause for which crankback may be generated;
in response to the determining, generating a new clearing message at the node including a crankback information element;
forwarding the new clearing message including the crankback information element to an entry border node, whereby the entry border node selects an alternate route over a second network link that does not support the best-route protocol to access the second network; and
wherein the link that does not support the best-route protocol is a Interim Inter Switch Protocol (IISP) link.

24. The method of claim 23 further comprising:
wherein the best-routing protcol is a Private Network Network Interface (PNNI) protocol.

25. A method for operating a node in a first computer network, the first computer network supporting a best-route routing protocol, the method comprising:
receiving by the node a clearing message indicating a link in a second network is blocked;
determining by the node that the clearing message arrived over a link to the second computer network that does not support the best-route protocol and that the clearing message contains a cause for which crankback may be generated;
in response to the determining, generating a new clearing message at the node including a crankback information element;
forwarding the new clearing message including the crankback information element to an entry border node, whereby the entry border node selects an alternate route over a second network link that does not support the best-route protocol to access the second network; and
wherein the link that does not support the best-route protocol is a User-Network-Interface (UNI) link.

26. The method of claim 23 further comprising:
wherein the crankback information element includes a blocked transit type field, a blocked transit identifier field, and a crankback cause field.

27. A network system comprising:
a first computer network implementing a PNNI network protocol;
a second computer network implementing the PNNI network protocol;
at least two network links not supporting the PNNI protocol interconnecting the first and the second computer networks;
switching node of the first computer network adapted to receive a clearing message from the second computer network indicating a link in the second network is blocked, the switching node further adapted to:
a) determine that the clearing message arrived over a first of the at least two network links not supporting the PNNI protocol and that the clearing message contains a cause for which crankback may be generated,
b) in response to the determination, generate a new clearing message at the switching node including a crankback information element,
c) forward the clearing message including the crankback information element;
an entry border node in the first computer network for receiving the clearing message including the crankback information and selecting an alternate route over a second of the at least two network links not supporting the PNNI protocol to avoid the link in the second computer network that is blocked; and
wherein the at least two network links not supporting the PNNI protocol are Interim Inter Switch Protocol (IISP) links.

28. A network system comprising:
a first computer network implementing a PNNI network protocol;
a second computer network implementing the PNNI network protocol;
at least two network links not supporting the PNNI protocol interconnecting the first and the second computer networks;
switching node of the first computer network adapted to receive a clearing message from the second computer network indicating a link in the second network is blocked, the switching node further adapted to:
d) determine that the clearing message arrived over a first of the at least two network links not supporting the PNNI protocol and that the clearing message contains a cause for which crankback may be generated,
e) in response to the determination, generate a new clearing message at the switching node including a crankback information element,
f) forward the clearing message including the crankback information element:
an entry border node in the first computer network for receiving the clearing message including the crankback information and selecting an alternate route over a second of the at least two network links not supporting the PNNI protocol to avoid the link in the second computer network that is blocked; and
wherein the at least two network links not supporting the PNNI protocol are User-Network-Interface (UNI) links.

29. The network system of claim 27 further comprising:
wherein the crankback information element includes a blocked transit type field, a blocked transit identifier field, and a crankback cause field.

30. A node in a first computer network, the first computer network supporting a best-route routing protocol, the node comprising:
- means for receiving at the node a clearing message indicating a link in a second network is blocked;
- means for determining by the node that the clearing message arrived over a link to the second computer network that does not support the best-route protocol and that the clearing message contains a cause for which crankback may be generated;
- in response to the determining, means for generating a new clearing message at the node including a crankback information element;

means for forwarding the new clearing message including the crankback information element to an entry border node, whereby the entry border node determines an alternate route over a second network link that does not support the best-route protocol to access the second network; and
- wherein the link that does not support the best-route protocol is a Interim Inter Switch Protocol (IISP) link.

31. The node of claim 30 further comprising:
- wherein the best-route routing protocol is a Private Network Network Interface (PNNI) protocol.

32. A node in a first computer network, the first computer network supporting a best-route routing protocol, the node comprising:
- means for receiving at the node a clearing message indicating a link in a second network is blocked;
- means for determining by the node that the clearing message arrived over a link to the second computer network that does not support the best-route protocol and that the clearing message contains a cause for which crankback may be generated;
- in response to the determining, means for generating a new clearing message at the node including a crankback information element;
- means for forwarding the new clearing message including the crankback information element to an entry border node, whereby the entry border node determines an alternate route over a second network link that does not support the best-route protocol to access the second network; and
- wherein the link that does not support the best-route protocol is a User-Network-Interface (UNI) link.

33. The node of claim 30 further comprising:
- wherein the crankback information element includes a blocked transit type field, a blocked transit identifier field, and a crankback cause field.

34. A computer readable medium containing executable program instructions for operating a node in a first network supporting a best-route routing protocol, the executable program instructions comprising program instructions for:
- receiving by the node a clearing message indicating a link in a second network is blocked;
- determining by the node that the clearing message arrived over a link to the second computer network that does not support the best-route protocol and that the clearing message contains a cause for which crankback may be generated;
- in response to the determining, generating a new clearing message at the node including a crankback information element;
- forwarding the new clearing message including the crankback information element to an entry border node, whereby the entry border node selects an alternate route over a second network link that does not support the best-route protocol to access the second network; and
- wherein the link to the second computer network that does not support the best-route protocol is an Interim Inter Switch Protocol (IISP) link.

* * * * *